: US008010645B2

(12) United States Patent
Shivaji Rao

(10) Patent No.: US 8,010,645 B2
(45) Date of Patent: Aug. 30, 2011

(54) METHOD AND APPARATUS FOR PROVIDING FEEDS TO USERS

(75) Inventor: Vishnu Kumar Shivaji Rao, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 551 days.

(21) Appl. No.: 11/383,183

(22) Filed: May 12, 2006

(65) Prior Publication Data

US 2007/0265857 A1     Nov. 15, 2007

(51) Int. Cl.
G06F 15/173     (2006.01)
G06F 15/16     (2006.01)
(52) U.S. Cl. ........................................ 709/223; 709/203
(58) Field of Classification Search .................. 709/212, 709/216, 217, 219, 225, 223; 707/3, 10
See application file for complete search history.

(56) References Cited

U.S. PATENT DOCUMENTS

| | | | |
|---|---|---|---|
| 7,152,058 B2 * | 12/2006 | Shotton et al. ..................... 707/3 |
| 7,913,287 B1 * | 3/2011 | Franken et al. ................ 725/141 |
| 2002/0026462 A1 | 2/2002 | Shotton, Jr. et al. | |
| 2003/0135493 A1 * | 7/2003 | Phelan et al. ..................... 707/3 |
| 2005/0038717 A1 | 2/2005 | McQueen, III et al. | |
| 2005/0165615 A1 * | 7/2005 | Minar ............................... 705/1 |
| 2005/0198056 A1 * | 9/2005 | Dumais et al. ................ 707/101 |
| 2005/0210514 A1 | 9/2005 | Kittlaus et al. | |
| 2005/0289468 A1 * | 12/2005 | Kahn et al. ..................... 715/738 |
| 2006/0015908 A1 | 1/2006 | Vermola et al. | |
| 2006/0026067 A1 | 2/2006 | Nicholas et al. | |
| 2006/0073812 A1 * | 4/2006 | Punaganti Venkata et al. ........................ 455/412.1 |
| 2006/0195428 A1 * | 8/2006 | Peckover .......................... 707/3 |
| 2006/0200443 A1 * | 9/2006 | Kahn et al. ......................... 707/1 |
| 2006/0200740 A1 * | 9/2006 | Kahn et al. ..................... 715/500 |
| 2006/0230021 A1 * | 10/2006 | Diab et al. ........................ 707/3 |
| 2006/0236258 A1 * | 10/2006 | Othmer et al. ................ 715/774 |
| 2006/0248209 A1 * | 11/2006 | Chiu et al. ..................... 709/231 |
| 2006/0253459 A1 * | 11/2006 | Kahn et al. ..................... 707/10 |
| 2006/0253489 A1 * | 11/2006 | Kahn et al. ..................... 707/102 |
| 2006/0271560 A1 * | 11/2006 | Mitchell ......................... 707/10 |
| 2007/0033007 A1 * | 2/2007 | Narahara et al. .................. 704/9 |
| 2007/0112635 A1 * | 5/2007 | Loncaric ......................... 705/26 |
| 2007/0207794 A1 * | 9/2007 | Dunko ........................... 455/419 |
| 2007/0225047 A1 * | 9/2007 | Bakos ........................... 455/566 |
| 2007/0226207 A1 * | 9/2007 | Tawde ............................ 707/5 |
| 2008/0126476 A1 * | 5/2008 | Nicholas et al. ............. 709/203 |
| 2008/0201386 A1 * | 8/2008 | Maharajh et al. ............. 707/201 |
| 2008/0207182 A1 * | 8/2008 | Maharajh et al. .......... 455/414.1 |
| 2008/0229181 A1 * | 9/2008 | Jung et al. ..................... 715/203 |

FOREIGN PATENT DOCUMENTS

WO     WO03007189     1/2003

OTHER PUBLICATIONS

"10 Tools to Combine, Mix, Blend Multiple RSS Feeds," http://www.tothepc.com/archives/10-tools-to-combine-mix-blend-multiple-rss-feeds.com; Mar. 30, 2008.
Blekas et al., "Use of RSS feeds for Content Adaptation in Mobile Web Browsing"; W4A at WWW2006, May 2006.

* cited by examiner

*Primary Examiner* — Ario Etienne
*Assistant Examiner* — Sargon N Nano
(74) *Attorney, Agent, or Firm* — Stolowitz Ford Cowger LLP

(57) ABSTRACT

A method of providing feeds to connected devices includes sorting multiple feeds, receiving device information from a connected device, suggesting a feed from the sorted feeds in response to the device information, and delivering the suggested feed to the connected device.

18 Claims, 2 Drawing Sheets

METHOD AND APPARATUS FOR PROVIDING FEEDS TO USERS

BACKGROUND

Because of the vast amounts of content on the Internet, numerous websites may include content related to the subject matter of a television program. Such related content may be specifically created for the television program, or may only be associated through the common subject matter. However, if a user wants to access the related content, the user must search for the content, typically on a personal computer. Furthermore, a user may not even be aware of the related content.

Typically, a television is not connected to the Internet. However, even if a computer or other device capable of accessing the Internet is connected to the television, the user must still search for the content.

Thus, there remains a need for an improved method and apparatus for providing content to television users.

SUMMARY

An embodiment includes method of providing feeds to connected devices including sorting multiple feeds, receiving device information from a connected device, suggesting a feed from the sorted feeds in response to the device information, and delivering the suggested feed to the connected device.

An embodiment includes a device including a content presenter to present primary content to a user, a network interface to receive feeds including control commands, a feed interface to select one of the feeds, and a control unit to execute a control command associated with the selected feed.

A further embodiment includes a system for providing feeds to connected devices including means for receiving multiple feeds, means for determining content presented on a connected device, means for selecting a suggested feed from the feeds in response to the content, and means for indicating on the connected device the availability of the suggested feed.

DETAILED DESCRIPTION

As used in this discussion a connected device includes any device that may communicate to another connected device through a network. The network may be any communications link that allows for the exchange of data. The connection to the network may be an intermittent link. For example, a connected device includes a television with an Ethernet connection. Another example is a handheld device such as a cellular telephone or personal data assistant (PDA) that has a wireless network connection.

Protocols such as RSS (referred to as Really Simple Syndication, Rich Site Summary, and other names) provide a way for users to be informed of changes in content. In particular, RSS may be used to determine if new content is available on an associated website. Thus, the user is saved the time of examining previously viewed content in search of new content.

As used in this discussion, content refers to any information, data, commands, and the like in any medium whatsoever.

The term feed is commonly associated with RSS and similar protocols. As used in this discussion, feed refers to a collection of data including at least a summary of content associated with the feed. For example, a website may indicate the polling results in an election. The feed may indicate a summary of the website, a time or unique identifier indicating if the website has new results, and a link to the website.

Figure 1:
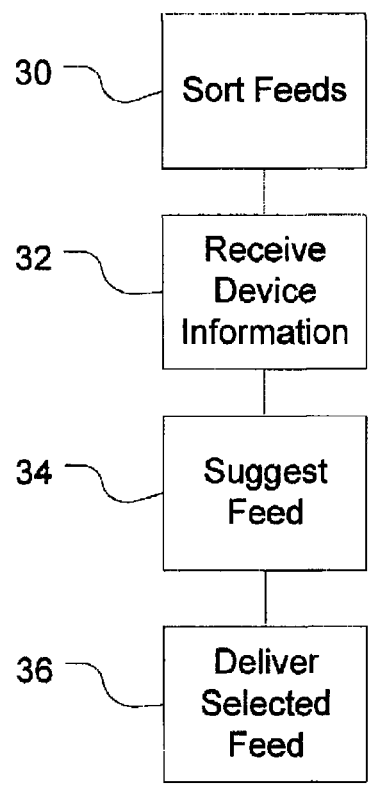
FIG. 1 is a flowchart of an embodiment of a method of providing feeds to connected devices.

FIG. 1 is a flowchart of an embodiment of a method of providing feeds to connected devices. The method includes sorting feeds in 30, receiving device information from a connected device in 32, suggesting a feed from the sorted feeds in response to the device information 34, and delivering the suggested feed to the connected device in 36.

The feeds may be sorted according to a variety of characteristics. The characteristics used for sorting include conditions of use of connected devices, content of the feeds or the content associated with the feeds, keywords characterizing the feeds and the associated content, and levels of detail or granularity.

The conditions of use include the environment of use and the configuration of a connected device. Any number of types of device in any number of environments may receive feeds. However, a user of one device may be interested in a particular group of feeds, yet the same user when using another connected device or the same connected device in another environment may be interested in another group of feeds. For example, a user of a cellular telephone may be interested in comical feed while returning home from work on a bus, yet the same user of the same cellular telephone may be interested in wine selections while at a restaurant.

To accommodate such a variety of desires, the environment of use may include a variety of characteristics, including the device location, time of day, local weather, local government structure, identity of the user, etc. Any characteristic that may characterize the environment within which the connected device is used may be used to sort the feeds.

The configuration of a connected device includes settings such as user preferences, connected device settings, connected device identification, etc. Any parameter or identification of the connected device may be used to sort the feeds. Expected user preferences and settings may be used to sort the feeds. Devices settings such as channels with parental locks, audio and video settings, favorite genres, and the like that may also be used to sort the feeds. A user may enter a preference for feeds related to breaking news stories. Another user may set a connected device to mute the audio output. Thus, the feeds may be sorted according to characteristics such as the user's preferred content or feeds, and the audio controls of the connected device.

The feeds may be sorted according to the content of the feeds and the feeds' associated content. The sorting may be performed using any characterization of the content. For example, such characterization may include genre, author, publication date, etc.

In addition, the feeds may be sorted according to keywords. Keywords may be generated from a variety of sources. For example, keywords may be extracted from closed caption text associated with a television program. Electronic program guides may provide keywords from the program descriptions, the channel descriptions, etc. The keywords may be extracted from both the feeds and the associated content. For example, if the feed is in the form of an RSS feed, then keywords may be extracted from fields of the RSS feed. For example, summary and title sections may provide keywords. In addition, images may be characterized to generate keywords associated with the image.

Furthermore, the keywords may be correlated to associate commonly used keywords together. Thus, another level of categorization may be generated. For example, hard drive and video card may be associated. In addition, priorities may be associated with keywords and combinations or correlations of keywords.

Furthermore, keywords associated with content may be further refined into common sense associations. For example, both a cooking recipe website RSS feed and a conservation website RSS feed both may be associated with the keyword feed. The cooking recipe may indicate types of food creating its association with the keyword food. The conservation website may list arguments for conservation as "food for thought." As a result, the keyword "food" would be associated with both feeds, yet would make more sense associated with the cooking recipe website than the conservation website. Thus, the association of feeds to keywords may be of a varying degree expressed in any manner, e.g., as a percentage.

Although the association between a keyword and a lesser related feed may be reduced, it may, but need not be, reduced to zero. Thus, if a user searches for any reference to food, the user may still be able to receive the conservation website RSS feed.

Keywords may be dynamically created. Keywords may be created from content presented to users. The content may be examined to determine new keywords. In addition, even if only preexisting keywords are discovered, the keywords may be associated with the content. Thus, keywords may be used that were not generated from the feeds or the associated content.

Although various levels of specificity have been used in examples of characteristics used to sort the feeds, any level of specificity may be used. For example, genre may include both broad categories such as science and art, and more narrow categories such as ant colony social structure and 17$^{th}$ century Flemish paintings.

Device information is received from a connected device. This information may be any type of information. For example, the information may be user preferences, device location, etc., similar or identical to the categories used to sort the feeds described above.

The device information need not be limited to the categories used to sort the feeds. In fact, the feeds may be further sorted in response to the received device information. For example, feeds may be sorted according to the hardware of connected devices. Groups may be created for media that connected devices may present. A device may only present audio content. Thus, text based feeds may not be presented on the device. In addition, the accessibility of the device to the feeds to the content may be used for sorting the feeds. For example, some devices may have high bandwidth data links to a server. Thus, that device may receive high bitrate content, such as high quality streaming video. However, another device with a low bandwidth data link may not be able to sustain a desired quality for high bitrate feeds. Thus lower bitrate content may be suitable for such devices. The feeds associated with the different bitrate content may be sorted according to desired bandwidth.

In addition, the feeds may be sorted according the model of the device. This is distinguished from hardware differences in that identical hardware may have different model numbers, and also have different reported capabilities. For example a first device designated a model A may have functionality to play audio music files. However a second device designated model B may have the same functionality, but with the functionality disabled. Thus feeds with audio music files would not be suitable for the second device. Such a sorting may be changed dynamically. For example, if at some point in time the functionality of model B devices is enabled, the sorting may remove the limitation on model B devices.

The content may also be sorted according to granularity. Between feeds there may be differing levels of content granularity. For example, one feed may be summaries of news articles, while another feed is the news articles themselves. Thus, there may be a varying degree of granularity between feeds. In addition, one feed may contain multiple levels of granularity. The example of the feed with the actual news articles may also include summaries of the articles. Furthermore, a title of a feed is another granularity. Thus, portions of one feed may be sorted according to granularity.

As described above, feeds may be sorted according to a variety of parameters, including connected device specific parameters. However, such sorting may be done without knowledge of a connected device actually accessing the feeds. The feeds may be sorted according to expected or predicted connected devices that may access the feeds. However, when a connected device actually accesses a feed, the connected device may provide specific information that may be used to sort the content and tailor the content to be provided to the device.

Additional parameters, keywords, locations, or other sorting criteria may be received from the device information and used to sort the feeds for all users and devices. As described above, some content presented to a user may not be identified or known to a server. However, the connected device may extract information from the program. This information may be transmitted to and received by a server. The server may select a suggested feed based on the received information. Thus, even if a user is viewing content that the server has no prior information about, the server may still suggest related feeds to the connected device.

Thus, using the device information, a suggested feed is selected from the sorted feeds. For example, the device information may include a user preference for military history. In response, a feed associated with a website on the Battle of Leyte Gulf.

This suggested feed is then delivered to the connected device. Thus, the connected device receives a feed that may be of interest to the user without requiring the user to search for the feed.

A user of a connected device may select a feed to be suggested to other connected devices. The feed is then delivered to other connected devices. Such delivery may be between connected devices, or may use an intermediary such as a server.

Control commands may be embedded in the feeds. The control command is then executed on the connected device. The control command may be a device independent control command. For example, different types of connected devices may execute the same commands through a common application programming interface (API). Thus, the control command may be in the format required by an API. A variety of connected devices would be able execute the control command embedded in the feed because it understands the API format.

Although connected devices have been described as having a common API, each connected device may have its own unique API. A device specific feed may be created with a control command using the unique API.

The control command embedded in the feed may, but need not be, executed when the feed is delivered to a connected device. When the user interacts with the feed, the control command may be executed in response to that interaction.

In addition, an input may be received from a connected device associated with a suggested feed. This input may be associated with a control command. The control command is then transmitted to the connected device in response to the input. For example, a television may display an icon indicating the suggestion of a feed related to a program a user is viewing. The user selects the suggested feed. The selection is transmitted to a server as an input from the connected device. In response, the server transmits a control command associated with the suggested feed to the connected device. Thus, the connected device is controlled from the server.

Although a method of embedding a command in a feed and transmitting a command in response to input have been described separately, both may be implemented in conjunction and/or simultaneously. For example, for some feeds, the command may be embedded. For other feeds, the command may be transmitted to the connected device in response to an input. Furthermore, one single user interaction may include both forms. An input may both execute an embedded control command and transmit an input to a server and receive and execute a control command in response.

The content delivered to a device may be monitored. From this content, keywords may be extracted. From the keywords, suggested content may be provided to the user. For example, if a user is viewing a television program on the Hawaiian Islands, the keyword "Hawaii" may be extracted from the program, for example from the closed caption text. In response, the server may suggest content related to Kamehameha I, who formally established the Kingdom of Hawaii. Thus, related content may be presented to the user, without the need for the user to search for the content. In addition, as described above, the keywords may be used to sort the feeds.

Conditions of use of a connected device may be used to select the suggested feed. As described above, a user's preference for feeds may change according to conditions of use of a connected device. By selecting a feed in response to the conditions of use of a connected device, the probability that the suggested feed will be accepted by the user increases. For example, location of the connected device may be the condition of use. If a connected device is used in a busy subway, a user may have reduced interest in a feed related to intimate matters. However, the user may be interested in a feed related to the most recent local cricket match. Thus, in this example, not only is the location used to select out undesired subject matter, the location may also be used to suggest feeds related to local matters.

In addition, control settings of the connected device may be used to suggest feeds. For example, if a user has muted the audio on the selected feed, a feed without audio, perhaps a text feed, may be suggested in place of another feed with audio that would otherwise have been suggested.

Device specific feeds may be created from existing feeds, or feeds may be modified to include new renderings of the feed. The capabilities of devices vary from device to device. Accordingly, new or modified feeds may be created suitable for the variety of devices. Specifically, the feed may be tailored to the particular medium presentable by a device. For example, an original feed may have high resolution video and multi-channel audio. While this may be acceptable to be presented on a high definition television, such a feed may not be presentable in its original format on a cellular telephone. The feed may be transmitted in its original form to the cellular telephone; and the cellular telephone may convert it into a suitable format. However, such a transmission may be a waste of available communications bandwidth. To aid in the efficient bandwidth use, and to reduce the burden on the cellular telephone, the feed may be converted into a lower resolution, mono audio format, suitable for the cellular telephone.

The types of media need not be preserved when creating a device specific feed. Using the above example, if the cellular telephone is unable to display video, the feed may be converted into a mono audio only format. Furthermore, the media of the original feed and the device specific feed need not overlap. For example, the original feed with audio and video may have the audio converted into text to be sent to the cellular telephone. Thus, the medium of the original feed and the device specific feed need not be the same.

Although a feed may be suggested to a user, the user may have access to all feeds available. A user interface may be used to sort the content and to convert the content into appropriate formats. Differing devices may have differing user interfaces. The interface may include a list or grouping arranged according to keywords, content, time, or any other characterization of the feeds.

In addition, the selection of feeds, the suggestion of feeds by a server, the suggestion of feeds by users, or other interaction with the feeds may be monitored to determine the popularity of feeds. The popularity rankings of the feeds may be transmitted to the connected devices. In addition, the popularity rankings may be used to suggest feeds to users. For example, the most popular feed among other users viewing a particular program may be suggested to other users viewing the same program. Thus, not only may the conditions of use of a particular device be used to suggest feeds to the connected device, but the conditions of use of other connected devices, including all connected devices may be used to suggest feeds to one device.

Figure 2:
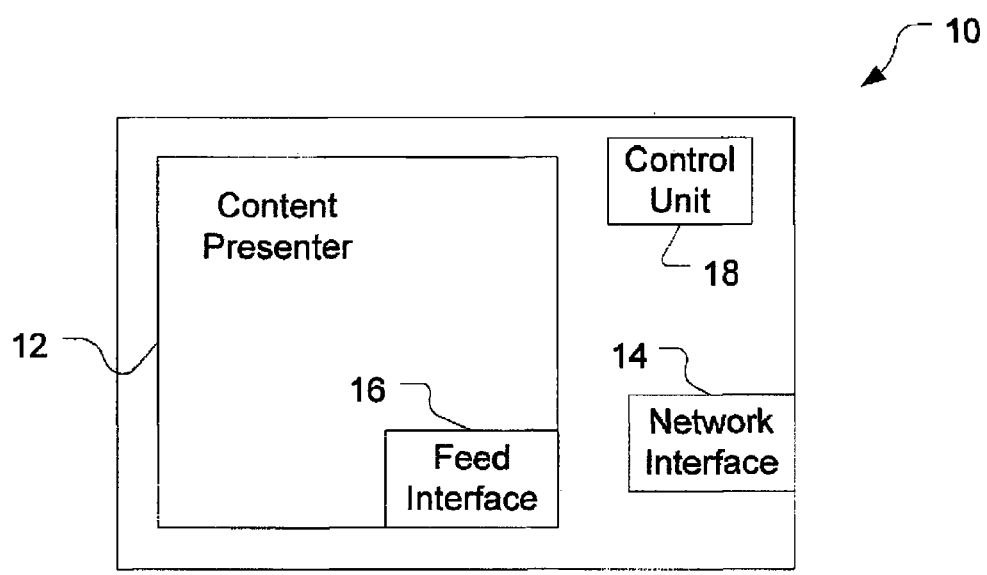
FIG. 2 is a block diagram of a device according to an embodiment.

FIG. 2 is a block diagram of a device according to an embodiment. The device 10 includes a content presenter 12, a network interface 14, a feed interface 16, and a control unit 18.

The content presenter 12 presents primary content to a user of the device 10. Primary content refers to content that is currently presented on the content presenter 12. The primary content may change and is not limited to any particular class of content. The content presenter 12 may present content in any media, however, specific implementations may be limited to specific media. For example, a television may present television programs with audio and visual signals. Thus, the content presenter 12 would include the television display and any audio speakers, and its associated hardware and software. The primary content would be the television programs displayed on the television display.

The network interface 14 is to receive feeds. The feeds may include control commands associated with the feeds as described above. The network interface 14 may be any communications link that allows for the reception of feeds as described above.

The feed interface 16 enables the display of and access to feed. Through the network interface 14, the device 10 is made aware of available feeds. Some or all of the feeds may be displayed on the feed interface 16.

The feed interface 16 may include a feed browser. Through the feed browser, the user may browse the available feeds. The browser may be implemented in a variety of ways. The user may enter a keyword and browse content available associated with the keyword. The user may browse all available feeds. The interface may present the feeds in any way that the feeds are sorted. Thus, if the feeds are sorted according to device hardware, the user may browse according to device hardware.

The feed interface may be implemented with a one button interface or other single action interface. A single action interface is an interface that is activated with or by a single action from a user. An example of such an interface is a dedicated button. Thus a user may press the dedicated button and an associated feed is presented. For example, a remote control may have a "weather" button to bring up the weather for the users local areas. Other feeds may be presented in response to other single action interfaces. For example, a program guide may appear in response to a single action. Any such grouping of feeds or even a single instance of a feed may be accessed through a single action.

In addition, as the primary content is displayed on the program presenter, the device 10 may receive feeds related to the primary content through the network interface 14. The feed interface 16 may indicate to the user that the related feeds are available. The user may select the indicated feed through the feed interface 16.

The feed interface 16 may take a variety of forms. The feed interface 16 may include a part of the content presenter 12. For example, the feed interface 16 may display an icon or other indicator on the content presenter 12. To access the content, the user may manipulate controls directly on the device 10 or on a remote control. For example, a user may press buttons on a remote control of a television to select an icon displayed on the television screen. Furthermore, the feed interface 16 may be physically separate from the content presenter 12. For example, the remote control may include an indicator to indicate a feed. Controls on the remote control may allow selection of the feed.

The control unit 18 may execute a control command associated with the selected feed. The control unit may control all functions or a subset of functions of a device. For example, a control unit within a television may only be able to change the channel of a tuner within the television. Alternatively, the control unit in the television may be able to change the audio volume of the television, the video source, or any other control on the television.

As described above, the control command may be embedded within a feed. Thus, the control unit 18 may execute the control command embedded in the feed. In addition, the feed interface 16 may transmit an input to a server. The control unit 18 may receive a control command from the server in response to the input. The control unit 18 may then execute the control command.

Although one control command has been described, any number of control commands may be embedded in a feed. Each command may be associated with a different interaction with the feed. For example, if a user changes focus to the feed, a brief description may appear as a result of a control command associated with the change in focus. In addition, if the user selects the feed, a different command, one associated with selection, may be executed.

Furthermore, as described above, although two types of control have been described, one with the command embedded in the feed and another with the server sending a command in response to an input, any combination of such techniques may be used. Thus, the control unit 18 may execute control commands embedded in the feeds, received from a server, or otherwise communicated to the control unit 18.

A particular example is control of a television through an RSS feed. An electronic program guide may be displayed by displaying RSS feeds. The RSS feeds indicate for a program or channel may be selected. The RSS feed for the selected program or channel may include a command instructing the television to tune to the appropriate channel. Thus, by allowing access to the RSS feeds, and associating controls with the RSS feeds, an electronic program guide may be implemented through the RSS feeds without needing specific program guide software. As a result, the controls and interface may be updated without updating the software on the device. Only the control commands in the feeds need to be updated.

Although a television has been used as an example of a device 10, other types of devices may be used. For example, a device 10 may include a cellular telephone. The network interface 14 may include a wireless network interface through the cellular communication network. The cellular telephone may include a video display and a speaker as the content presenter 12. The feed interface 16 may include both physical keys and soft keys, and the display.

The connection using the network interface 14 may form a secure connection. Since the device 10 may be controlled through the network interface 14, a user may want some assurance that unauthorized control does not occur. The connection may be secured by methods such as encryption, passwords, or any other securing technique.

Through the network interface 14, user data and information may be communicated to a server. Such information may include device information, input types, location, user preferences, etc. Any device information, such as the device information described above may be communicated to the server. As described above, this information may used by the server to determine feeds to be suggested to the user.

In addition, the network interface 14 may receive the suggested feeds. The feed interface 16 may indicate the suggested feed. Thus, the user of the device 10 is presented with a suggested feed. In particular, the suggested feed maybe related to the content presented on the content presenter 12.

As described above, there may be vast amounts of content available related to a particular program. Thus, even if content is selected to be suggested to the user as a feed, the number of suggested feeds may still be overwhelming for a user. To alleviate this problem, the user may further customize the content by applying a filter through a feed filter interface. The filter characteristics may further refine what will be presented as feed. The user specifies further parameters that are used to filter the feeds suggested to the user.

The feed filter interface may have a varying degree of complexity. For example, the feed filter interface may only be able to filter on one characteristic describing the feeds. Alternatively, the feed filter interface may have functionality to characterize and sort feeds as described above.

An electronic program guide (EPG) is a program guide that is presentable on a device 10. The EPG aids the user in the determination of what content to select by listing the availability of content. The device 10 may generally tune to selected content. The feed interface 16 may include icons associated with entries in the EPG. The icons may indicate the availability of feeds suggested in relation to the associated entry in the EPG. For example, an EPG entry may list a news program with an interview with an actor. The associated suggested feed may indicate content associated with the actor such as upcoming movies, biographies, past performances, etc.

Furthermore, the feeds may be merely associated with entries of an EPG, not forming the EPG itself. As a result, feeds may be suggested based on the interaction of the user and the EPG. For example, if a user is browsing the EPG, the user may change the focus in the EPG to a particular entry. The feed interface 16 may select a feed associated with that particular EPG entry. In response, the control unit 18 may execute a command associated with the selected feed. The command may present the feed to the user. Thus, as a user browses an EPG, feeds associated with the focus of the user's interaction with the EPG may be selected and presented to the user.

Typically a device with an EPG needs dedicated EPG software to provide an interface to the EPG. However, by embedding control commands in the feeds, the device 10 may be controlled to display an EPG in a desired format by accessing the EPG through a feed. Thus, the EPG presentation and interactivity may be implemented through the embedded control commands. As a result, dedicated EPG software is no longer needed.

Although the presentation of an EPG has been described as implemented through control commands, any function of the device 10 may be similarly implemented. For example, the setting of video controls may be implemented through control commands. The selection of a video control feed may bring up the video control interface, displaying feeds for the various functions. Thus, the appearance and functionality of existing devices 10 that may execute control commands may be modified by embedding different commands in the feeds associated with the desired function.

Furthermore, although the above examples of control of a device 10 through control commands associated with feeds has been described as using embedded control commands, as described above, any technique of providing control commands to the control unit 18 may be used.

As described above, a user may browse through available content, and content may be suggested to the user. From the suggested content, the user may find content that interests the user. The user may determine that other users may be interested in the content. The user may suggest the content to other users. This may be accomplished by informing the server of the suggested content. The server would then suggest the content to the other users. Alternatively the device may suggest directly to other devices. The access to these features may be through a content selection interface.

Figure 3:
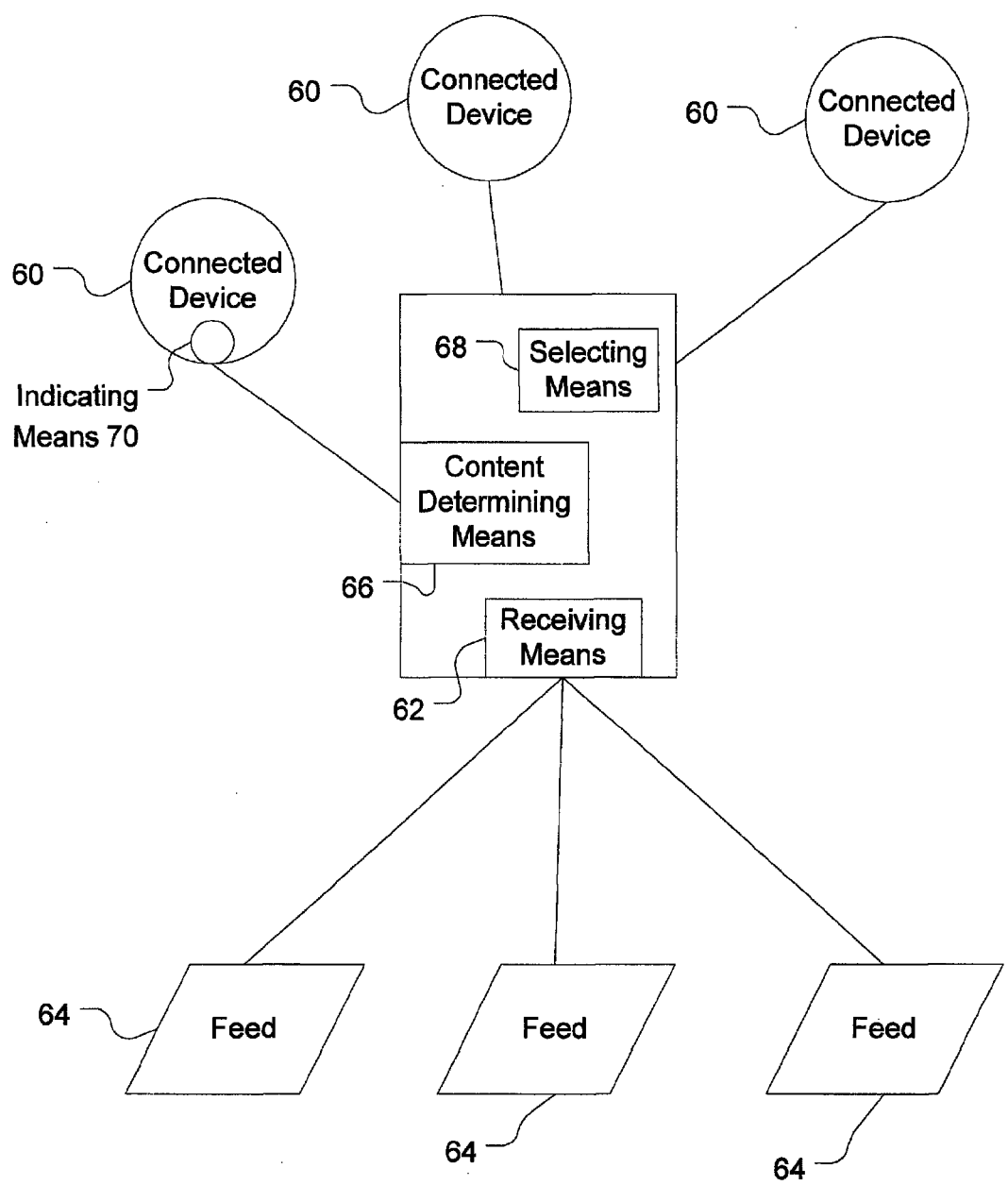
FIG. 3 is a block diagram of an embodiment of a system for providing feeds to connected devices.

FIG. 3 is a block diagram of an embodiment of a system for providing feeds to connected devices. The system 58 includes means for receiving feeds 62, means for determining content presented 66 on a connected device 60, means for selecting a suggested feed 68 from the feeds in response to the content, and means for indicating on the connected device 70 the availability of the suggested feed.

The means for receiving the feeds 62 includes a communications link to sources of the feeds and associated controls to regulate the communication. The communications link may be continuous or may be intermittent. For example, the means for receiving the feeds may include a network connection to the Internet (and associated hardware and software).

The means for receiving the feeds 62 may include an intermediary through which the feeds are received. For example, dedicated servers may receive feeds of a particular category. The means for receiving the feeds 62 may include access to each of the dedicated servers.

The means for determining content presented 66 may include monitoring devices or software on the connected device 60. As described above, the content presented on a connected device 60 may be monitored to aid in suggesting a feed. Since the information received from a connected device 60 may not be sufficient in itself to identify the content presented, the means for determining content presented 66 may also include software or hardware to analyze the content presented to enable the suggestion of feeds to the device 60.

The means for selecting a suggested feed 68 from the feeds in response to the content may include a processor executing software to sort and examine the feeds, dedicated hardware to sort and examine the feeds, a person manually indicating that a feed is to be suggested, or any other device or system capable of performing the functions described above.

The means for indicating 70 on the connected device the availability of the suggested feed may include a variety of indicators. As described above, an icon that appears when a suggested feed is available. The means for indicating 70 includes such icons and similar means such as a pop-up window along one side of a display to indicate feed availability, and a browseable listing of feeds that highlights a suggested feed. Any other means for indicating that may draw a user's attention to the notice of the availability of a suggested feed may be used as the means for indicating 70.

The system 58 may also include a means for receiving device information from the connected device. As described above, device information may be received from connected devices. The means for receiving the device information may include a network connection, a wireless connection, a telephone connection, an infrared communication link, or any other communications link that may allow the device information to be received from the connected device.

The system 58 may also include means for sorting the feeds in response to the device information. If the system 58 receives device information, as described above, the device information may be used to both sort available feeds and to suggest feeds to connected devices.

The system 58 may include means for adding device specific commands to the feeds control a connected device 60. In addition, the system 58 may include means for receiving in a server a user input on the connected device from the connected device, and means for controlling the connected device in response to the user input received in the server. As described above connected device may be controlled through control commands. The above described means may include a server or any other combination of hardware and software to modify the feeds to add a control command, or respond to a user input.

The system 58 may include means for creating a plurality of device specific feeds from the feeds. Each device specific feed is associated with a type of a connected device and created to be presented in a medium of the associated type of connected device. The means for creating a plurality of device specific feeds may include dedicated hardware or any combination of hardware and software on a server or within a connected device 60.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method of providing feeds to one or more connected devices comprising:
   accessing a plurality of feeds wherein feed content is associated with syndicated periodic Internet website updates;
   receiving connected device condition of use information from a connected device comprising: location, environmental context or time information, or combinations thereof;
   receiving device characteristic information from the connected device corresponding to one or more characteristics of the connected device, the device characteristics including at least one of: device settings, mode, hardware, bandwidth capabilities or model;
   sorting the plurality of feeds into one or more groups of feeds according to shared characteristics corresponding to the feed content based on a combination of the content of the feeds, the condition of use information and the device characteristic information;
   suggesting a feed from the sorted groups of feeds;
   embedding a control command in the suggested feed, where the control command is configured for execution on the connected device based on the device characteristic information to terminate, enable or change a function of the connected device, or combinations thereof; and delivering the suggested feed to the connected device; and
   delivering the suggested feed to other connected devices.

2. The method of claim 1, wherein the control command is executable via a common application programming interface on the connected device or via a device specific application programming interface on the connected device.

3. The method of claim 1, further comprising:
   receiving an input from the connected device associated with the suggested feed; and
   transmitting a control command associated with the suggested feed to the connected device in response to the input.

4. The method of claim 1, wherein sorting the feeds comprises:
   characterizing the feeds using identifying information from the feeds; and
   sorting the feeds in response to the characterizing.

5. The method of claim 1, wherein selecting the suggested feed comprises selecting the suggested feed in response to a keyword from the connected device.

6. The method of claim 1, further comprising:
   receiving information corresponding to a current program presented on the connected device;
   wherein selecting the suggested feed comprises suggesting a feed associated with the current program.

7. The method of claim 1, further comprising sorting the plurality of feeds into one or more device specific groups of feeds, wherein each device specific feed is capable of being presented in a medium of an associated type of connected device.

8. The method of claim 1, further comprising:
   presenting an organized interface to the feeds on the connected device, the interface organized according to keywords.

9. A device comprising:
   a content presenter comprising a display to present primary content, where the primary content originates in a feed;
   a network interface to:
      transmit conditions of use and configuration information associated with the device to a server;
      where the conditions of use comprise: physical location, environmental context or time, or combinations thereof;
      where the configuration information comprises the device: settings, mode, hardware, bandwidth capabilities or model, or combinations thereof; and
      receive feeds including embedded control commands and wherein the feeds share characteristics corresponding to the primary content of the feeds and responsive to condition of use and configuration information;
   a feed interface to select one of the feeds;
   a control unit to execute a control command embedded in the selected feed where the control command corresponds with a function of the content presenter associated with the configuration information; and
   a feed suggestion interface configured to transmit a suggested feed to another device or a server.

10. The device of claim 9, where the control command corresponds to the condition of use and device configuration information.

11. The device of claim 9, where:
    the feed interface is configured to transmit an input to the server; and
    the control unit is configured to execute the feed command received from the server in response to the input.

12. The device of claim 9, comprising a feed filter interface configured to filter the feeds responsive to user input.

13. The device of claim 9, where the feed interface comprises a feed browser to present available feeds to a user.

14. The device of claim 9, where the feed interface includes a single action interface to select the feed in response to a single user input.

15. The device of claim 9, where:
    the primary content is an electronic program guide;
    the selectable characteristics of the feeds are associated with entries in the electronic program guide, where the entries indicate subject matter of content of the feeds; and
    the control unit is configured to cause the content presenter to present content associated with the selected feed as the primary content.

16. A system for providing feeds to a connected device, comprising:
    means for accessing a plurality of feeds based on a content of the feeds;
    means for receiving the plurality of feeds;
    means for sorting the plurality of feeds into one or more groups of feeds based on the content of the feeds;
    means for indicating content preferences for selecting custom feeds to be presented on the connected device;
    means for characterizing and indicating a context of use for the connected device, where the context of use comprises time of day, geographic location information and environmental information;
    means for associating the context of use with one or more of the content preferences;
    means for adding device specific commands to the feeds responsive to the content preferences and the context of use;
    means for receiving device information from the connected device, wherein the device information includes one or more of the following: device settings, mode, hardware, bandwidth capabilities or model;

means for selecting a custom feed or group of custom feeds from the grouped feeds in response to the content, the context of use and on the device information; and means for indicating on the connected device an availability of a suggested feed.

17. The system of claim 16, further comprising:

means for receiving in a server a user input on the connected device from the connected device; and means for controlling the connected device in response to the user input received in the server.

18. The system of claim 16, further comprising:

means for characterizing and indicating a connected device mode for feed delivery; and means for creating a plurality of device specific feeds from the feeds, each device specific feed associated with a type of a connected device and created to be presented in a medium of the associated type of connected device in the indicated mode for feed delivery.

* * * * *

UNITED STATES PATENT AND TRADEMARK OFFICE
CERTIFICATE OF CORRECTION

PATENT NO. : 8,010,645 B2
APPLICATION NO. : 11/383183
DATED : August 30, 2011
INVENTOR(S) : Vishnu Kumar Shivaji Rao It is certified that error appears in the above-identified patent and that said Letters Patent is hereby corrected as shown below:

In the Claims

At Column 13, Line 3, Claim 16, delete "information; and" and insert --information; means for embedding a control command in a suggested feed, where the control command is configured for execution on the connected device based on the device characteristic information to terminate, enable or change a function of the connected device, or combinations thereof;--, therefore.

At Column 13, Line 5, Claim 16, delete "feed." and insert --feed; and means for transmitting the connected device suggested feed to other connected devices.--, therefore.

Signed and Sealed this
Seventh Day of October, 2014

Michelle K. Lee
*Deputy Director of the United States Patent and Trademark Office*